(12) United States Patent
Hailey

(10) Patent No.: US 6,441,865 B1
(45) Date of Patent: Aug. 27, 2002

(54) PHOTOGRAPHIC SYSTEM USING CHROMA-KEY PROCESSING

(75) Inventor: Keith R. Hailey, Amersham (GB)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/924,286

(22) Filed: Sep. 5, 1997

(30) Foreign Application Priority Data

Dec. 20, 1996 (GB) ............................................. 9626525

(51) Int. Cl.[7] ............................. H04N 9/75; H04N 9/74
(52) U.S. Cl. ....................................... 348/586; 348/592
(58) Field of Search ............................. 352/45, 46, 47, 352/48, 49; 348/239, 586, 587, 592, 674, 584, 220, 598, 599, 675

(56) References Cited

U.S. PATENT DOCUMENTS

| 4,408,221 A | * | 10/1983 | McCoy | 348/587 |
| 4,417,791 A | * | 11/1983 | Erland et al. | 352/45 |
| 4,589,013 A | * | 5/1986 | Vlahos et al. | 348/587 |
| 5,400,081 A | * | 3/1995 | Chaplin | 348/587 |
| 5,444,483 A | * | 8/1995 | Maeda | 348/239 |
| 6,148,148 A | * | 11/2000 | Wain et al. | 348/584 |

FOREIGN PATENT DOCUMENTS

| GB | 2307126 | * | 5/1997 | 348/592 |

* cited by examiner

*Primary Examiner*—Wendy R. Garber
*Assistant Examiner*—Rashawn N. Tillery
(74) *Attorney, Agent, or Firm*—Peyton C. Watkins

(57) ABSTRACT

A photographic system 1 comprising a digital still camera 3 for producing an output signal, means 11 for processing the output signal with a pre-recorded picture signal to produce a revised image signal and means 13 for printing the revised image, wherein the means 11 for processing uses chroma-key processing 37,39 to insert a background picture signal into a key color-characterized region of a foreground picture signal The invention results in a novel application of chroma-key processing to produce good quality still photographs using a simple and robust system.

17 Claims, 2 Drawing Sheets

PHOTOGRAPHIC SYSTEM USING CHROMA-KEY PROCESSING

FIELD OF THE INVENTION

This invention relates to photographic systems, and in particular to a system for producing good quality still photographs using chroma-key processing.

BACKGROUND OF THE INVENTION

There are many applications, such as Theme Park and Theater Event photography, where the capability of "cutting out" a subject from an image and pasting the subject onto a different background is desirable. This may be achieved by capturing an image of the subject against a colored background and processing the image such that where the background color occurs in the scene, it is replaced by a second image. This "chroma-key" or "blue screen imaging" is a technique commonly used in television and film production. Additionally, by overlaying a third image, a three level composite image can be produced.

PROBLEM TO BE SOLVED BY THE INVENTION

Although the use of chroma-key processing in video images for television or films, for example, results in a satisfactory end product, the loss of detail around a subject, which is not readily apparent to a viewer of video images, can occur. More particularly, the background color which acts as the "key" may be modified, for example as it diffuses through the hair of a subject, thereby making difficult the decision as to whether it constitutes the colored background or the subject. This can result in loss of hair detail and a colored "halo" effect on the final image. Further, false keying on the clothes of a subject, when the color of the clothes matches the key color, can also be a problem. Maintaining a low latitude to the color background color, as is desirable to minimize false keying on clothes, unfortunately exacerbates the problem associated with the halo effect around the hair of a subject.

The present applicant has already developed and launched a digital photographic system (known as the Photo Print System) which uses a charge coupled device (CCD) camera, a digital processor and a thermal printer for use in portraiture situations where the "instant" production of high quality images is required. This system has the ability to produce prints with varying formats or packages and add theme borders or overlays. Examples where such a system might be applicable include "Mall imaging" (e.g. photos with Father Christmas) and Special Events (e.g. a Graduation Ball). Control of the system is made very simple by employing a Touch Screen Monitor. Such a Photo Print System, without any chroma-key facility, was launched by the present applicant in the autumn of 1995.

SUMMARY OF THE INVENTION

The present invention relates to an improvement over the Photo Print System by using a chroma-key process to produce good quality still photographs from the output of a digital still camera. Further, a photographic system according to the present invention is sufficiently simple and robust to be used in many operating environments by unskilled operators. This operating situation contrasts significantly with that which exists in a television or film application, wherein the ambient light conditions and appearance of a subject can be entirely controlled.

In one aspect, the present invention provides a photographic system comprising a digital still camera for producing a first output signal, means for processing the first output signal with a pre-recorded second output signal to detect an object, and means for extracting and combining the detected object with a third image signal to produce a revised image signal wherein the means for processing adjust the camera output signal to a gamma value of about unity prior to processing with the prerecorded second output signal.

Advantageously, the photographic system comprises means for printing the revised image signal.

The first output signal may comprise the object against a selected background, which preferably consists of a single color. The pre-recorded second output signal may comprise a picture signal of the key color background. The processing means may be arranged to define the object of the first output signal. The third image signal may comprise a picture signal of the background image that is required for the object.

In another aspect, the present invention provides a photographic system comprising a digital still camera for producing an output signal, means for processing the output signal with a pre-recorded picture signal to produce a revised image signal and means for printing the revised image, wherein the means for processing uses chroma-key processing to insert a background picture signal into a key color-characterized region of a foreground picture signal and in which the means for processing adjusts the camera output signal to a gamma value of unity prior to the chroma-key processing.

As far as the applicant is aware, the use of chroma key processing in connection with the output from a digital still camera to produce still photographs is novel and was not in any way obvious when this invention was made due to the problems associated with the quality of images produced using the known chroma-key techniques.

This is a marked change from the television or film chroma-key processing systems, wherein a gamma value of about 0.4 is normally used. Further, if a gamma value of 0.4 were to be used in the chroma-key processing of an output from a digital still camera, a very poor quality revised image may result if ambient conditions change.

The means for processing preferably extracts and stores detail from the foreground picture signal prior to the chroma-key processing. By extracting and storing this information, the quality of the revised image can be improved following the chroma-key processing during which detail can often be lost. The detail from the foreground picture signal is preferably recombined with the revised image signal following chroma-key processing and prior to the printing of the revise image.

The detail from the foreground picture signal which is extracted and stored by the processing means is preferably limited to a peripheral region of a subject which is to appear in the revised image. This is because the loss of detail resulting from the chroma-key processing exists primarily around the periphery of the subject due to the merging of the key color background with the hair, for example, of the subject. Thus, the characteristics of the detail extracted can be more closely matched with those lost during the chroma-key process.

The periphery or "rim" of a subject may be determined by means of a filter. For example, the filter may establish an area of perhaps 11 pixels wide around the subject periphery and will include areas which are fully enclosed by the subject, such as under an arm or clump of hair of the subject.

A photographic system is provided, including a digital still camera, which is arranged to use chroma-key processing. The camera produces a first output signal and processes this with a pre-recorded second output signal to detect an object. The detected object is extracted and combined with a third image signal to produce a revised image signal. Prior to processing with the prerecorded second output signal, the camera output signal is adjusted to a gamma value of about unity. This ensures that the camera is suitably robust for operation, which is independent of ambient light conditions.

The means for processing preferably includes a reference image store for receiving chroma characteristics, and preferably luminance characteristics, corresponding to the key color-characterized region of the foreground picture signal As will be appreciated, by storing this information when the photographic system is initially commissioned or set-up at a particular location, it is not necessary to obtain the information each time the digital still camera takes a picture of a subject. This is somewhat surprising, since ambient light conditions will vary depending on the time of day, for example, but a system according to the present invention automatically deals with such light variation to produce consistently good revised image pictures.

The chroma and/or luminance characteristics, which are stored in the reference image store, are preferably averaged over a 7 pixel by 7 pixel array. This averaging could, of course, take place over a larger or smaller number of pixels depending on the camera being used, but a 7×7 pixel array average has been found to be sufficient to calibrate a practical system taking into account the camera noise, without resulting in excessive processing time.

The digital still camera preferably includes a charge coupled device array.

Further, a color filter array preferably overlays the CCD array.

In a particular embodiment, the color filter array may have a Bayer pattern of red, green and blue.

Preferably a cathode ray tube communicates with the digital still camera to display the output signal from the digital still camera. Such an arrangement enables an operator to view a picture taken by the camera, prior to the chroma-key processing of the picture.

Although the means for printing the revised image is preferably a thermal printer, any other appropriate apparatus may of course alternatively be used.

The color of the key color-characterized region of the foreground picture signal is preferably green. This is because a color filter array having a Bayer pattern has twice as many green pixels as red or blue and the green spectral response is broad, moving it closer to luminance, and has the lowest noise level.

In a particular application of the photographic system according to the present invention, a light source may be included to remove any shadow from behind a subject during preparation of the digital still camera output signal If a shadow does occur, it may affect the chroma and/or luminance characteristics of the key color-characterized region of the foreground picture signal, thereby resulting in the area of the shadow not being replaced by the pre-recorded background picture signal.

BRIEF DESCRIPTION OF THE DRAWINGS

A specific embodiment of the present invention is now described, by way of example only, with reference to the accompanying drawings, in which.

DETAILED DESCRIPTION OF THE INVENTION

Figure 1:
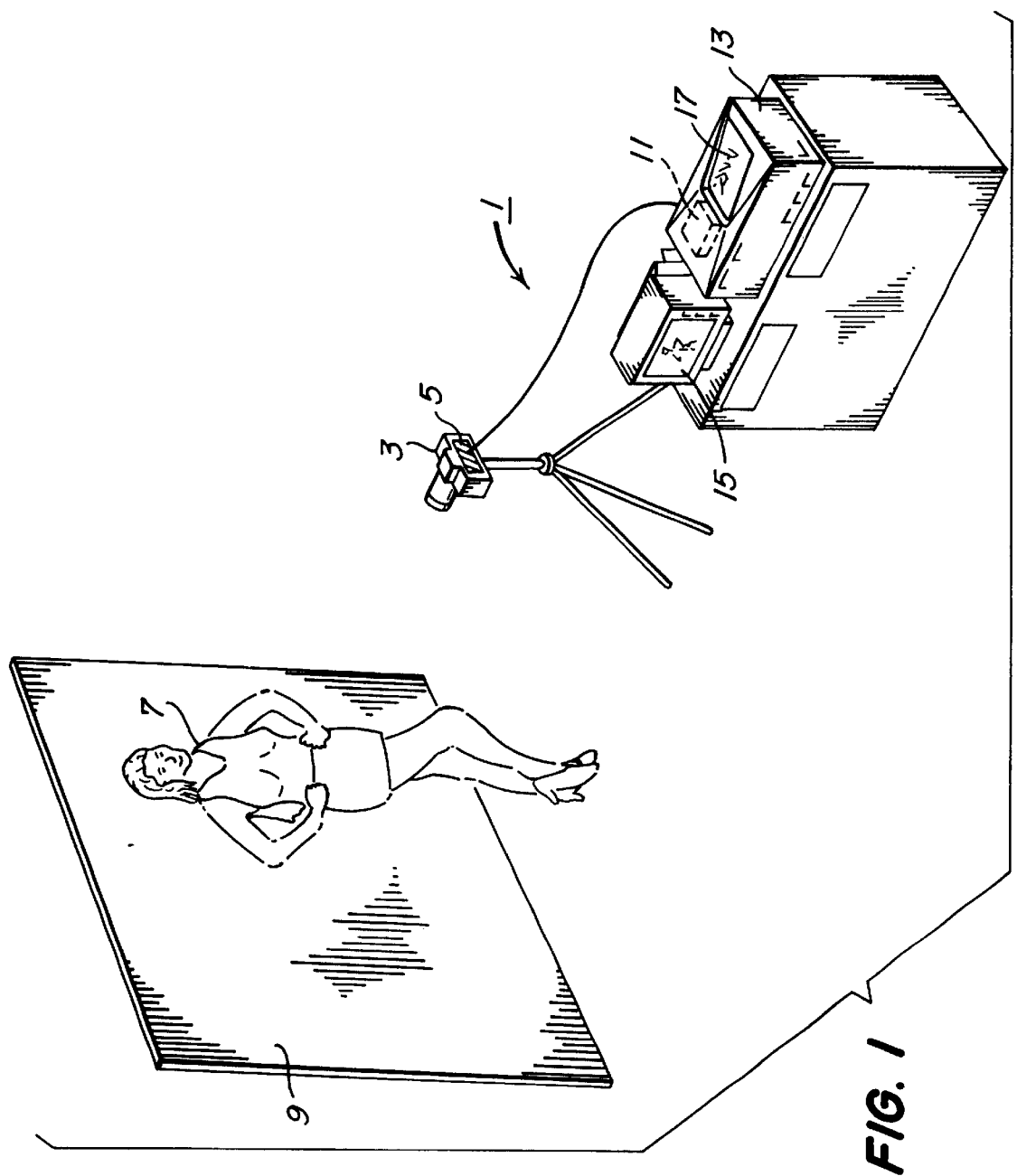
FIG. 1 is a schematic representation of a photographic system according to the present invention in use.

A photographic system 1 according to the present invention comprises a digital still camera 3 having a charge coupled device array 5 for producing a digital output signal corresponding to a picture taken by the camera 3. This picture will relate to a subject 7, such as a human head, in front of a well saturated colored background 9, which is preferably green. The CCD array 5 in a specific embodiment has an array of 1536 pixels×1024 pixels with an overlaid color filter array defining a Bayer pattern.

A processor 11, which may be incorporated in a thermal printer 13, receives the output signal from the digital still camera 3 and displays information on a Touch Screen Monitor 15. During use, an operator of the system 1 interacts with instructions appearing on the monitor 15 to activate the camera 3 to produce an output signal, representing the picture of the subject 7 in front of the colored background 9, which is passed to the processor 11. The operator is then asked by the monitor 15 to decide on a pre-recorded background picture which is to be inserted, using the chroma-key process, in place of the colored background appearing in the output signal from the camera 3. Following processing of the output signal a print 17 of the revised image, with the subject surrounded by the chosen background (and possibly with a third layer image overlaid on the front of the picture) can be printed by the thermal printer 13.

With specific reference to FIG. 2 of the drawings, processing steps undertaken by the photographic system 1 are as follows.

During initial installation and commissioning of the system 1, a key color calibration channel 21 is activated and the camera 3 takes a picture of the colored screen 9 without a subject 7 in front. The output from the camera 3 is input to the processor 11, which stores chroma and luminance information relating to each pixel of the CCD array 5 for use during chroma-key processing as a reference. In this way, any non-uniformities in the camera CCD array 5 are overcome.

The calibration image signal based on the picture of the screen 9, is averaged (step 23) over a 7 pixel×7 pixel array to reduce the effects of camera noise. Further, the signal is used to calculate (step 25) the chroma information (R/LUM, G/LUM, B/LUM) independent of luminance for the red, green and blue pixels, and to obtain a luminance value LUM. In this way, the key color background color of background 9 can be stored in a reference image store 27 of the processor 11. The photographic system 1 is then calibrated and ready for normal usage. Calibration is subsequently required only in the event of a change in the environment, such as the location or the lighting.

Initially, a picture is taken of a subject 7 against the colored background 9. The output signal from the CCD array 5 of the camera 3 is passed to the processor 11, adjusted to reduce its gamma value and interpolated to extract a full resolution red, green and blue output. At this stage, the image gamma value is adjusted to be suitable for viewing on the monitor 15. An operator can then view the photograph taken by the camera 3 to check that the subject 7 is in focus and correctly positioned, for example.

Following the initial capture of the photograph and processing (step 29) to view the photograph, the gamma value of the camera output signal is once again adjusted to unity so that the output pixel values are again proportional to the scene reflectance. This is because scene reflectance values are an essential requirement to determine chroma values, independent of luminance, which are necessary to ensure maximum immunity to changes in the intensity of scene lighting. This adjustment is not undertaken during chroma-key processing of a video T.V. or film signal, presumably because a skilled operator will make appropriate adjustments during the initial recordal of the video signal.

When the gamma of the output signal has been adjusted to unity (step 31), step 33 results in extraction of detailed information from the photograph of the subject 7. This is carried out by means of a high pass digital filter. This information is reintroduced into the revised image signal at step 35, following chroma-key processing (37,39) of the image signal By extracting image information before the chroma-key processing of the image signal, detail relating to the hair of a subject 7, for example, which can be lost during chroma-key processing, perhaps because of flare, can be reintroduced to improve the final revised image prior to printing of the resulting photograph.

Figure 2:
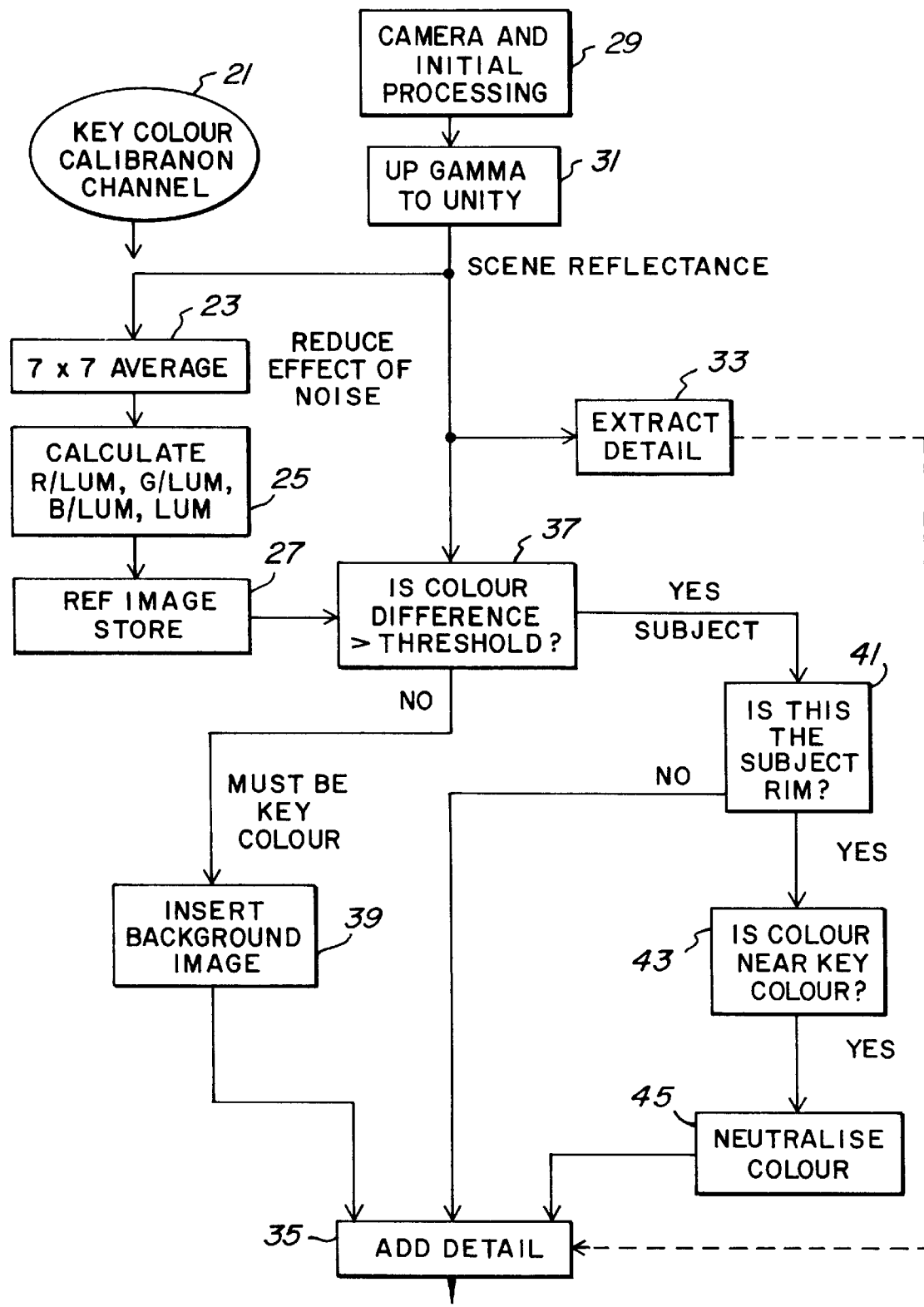
FIG. 2 shows a block diagram highlighting significant steps in the chroma-key processing used in a photographic system according to the present invention.

Although not shown specifically in FIG. 2, an improved result would be achieved if the detail extracted at step 33 applied only to the periphery or "rim" of subject 7. The location of the rim area is available (as described below) but, if this were implemented, the processing time would be increased. Hence, a photograph containing larger head sizes, for example, would benefit from this as the detail extraction stage response could be more closely matched with that lost in the chroma-key processing.

The main portion of the adjusted camera output signal from step 31, however, passes on to processing step 36, where chroma and luminance values are obtained therefrom analogously to those obtained in step 25 during calibration.

The main chroma-key processing step is indicated by steps 37 and 39 in FIG. 2. More particularly, a pixel-by-pixel comparison is made in a comparator in step 37 of chroma and luminance values between, on the one hand the subject image signal from the camera 3 as obtained in step 36 and, on the other hand the reference signal values stored via the key color calibration channel 21 in the reference image store 27. Outputs from pixels where the difference in values is less than a chosen threshold are replaced in step 39 by corresponding pixels from a pre-recorded, and selected, background image. Both chrominance and luminance comparisons are made to give the best rejection of near key color background colors. In practice, the chroma comparison is made more accurately than the luminance comparison, thereby providing immunity to changes in the scene lighting levels. Thus, for the majority of the background to a subject 7 appearing in the photograph taken by the camera 3, a straightforward replacement of the green background with a pre-recorded image occurs. The signal with the inserted background image is then passed to step 35.

If the difference detected in step 37 between the chroma and luminance levels of the subject image signal from step 36 and the reference signal from the reference image store 27 is greater than the chosen threshold, the processor 11 must decide (step 41) whether or not the pixel relates to a peripheral (or rim) region of the subject 7. This is carried out in step 41 in FIG. 2. The "rim" of the subject is determined by means of a filter which empirically establishes an area of 11 pixels wide around the subject periphery. If the pixel being evaluated does not fall within the rim of the subject, then the output from the pixel is unchanged and passes to step 35. Conversely, if the pixel does relate to a portion of the rim of the subject 7, step 43 asks whether or not the chroma of the pixel output is near the key color of the background 9 stored in the reference image store 27 by applying to the signal a slightly higher threshold value than that of step 37. If so, it is likely that the pixel output will result in a halo effect around the rim of the subject in the final revised image. In this case, the output goes to step 45 where the color resulting from that pixel is moved towards neutral (Le. gray), thereby avoiding a halo of the key color (in this example, green) being produced in the revised image. For a pixel which is producing an output which is not near the key color, the answer to the question raised in step 43 will be "NO" and the color of the pixel will not be neutralized by step 45, but will instead be passed directly from step 43 to step 35.

Following the combination of the chroma-key, detail, and peripheral processing signals in step 35, the revised image, with the subject 7 presented in front of the selected pre-recorded background image, can be printed by the thermal printer 13. Prior to this, if necessary, the revised image can be displayed on the monitor 15.

As will be appreciated, the photographic system 1 has been orientated. towards minimal lighting requirements. However, if a single studio flash unit is used, a shadow may be thrown by the subject 7 onto the background 9. It has been found that the color in such a shadow is often modified due to multiple reflections off the rear of the subject 7. Accordingly, the chroma-key processing step 37 may not recognize the shadow as having the correct color to enable it to be replaced by the chosen pre-recorded background image. Hence, additional lighting may be desirable to avoid shadows being thrown by the subject 7, thereby allowing the subject to blend correctly with the new background of the chosen pre-recorded image.

The use of flash lighting with an electronic still camera assists with the immunity to ambient light changes as the peak intensity of the flash is high and tends to swamp any lower level ambient light changes. This is an advantage over systems using T.V. cameras, where it is technically difficult to use flash lighting and, as a result, high levels of conventional studio illumination are used.

On the basis that an initial evaluation exposure is made without a subject 7, which is input to the key color calibration channel 21, in principle any background color may be used for the background 9. Gradual variations in illumination are also not important. However, in practice the system prefers that a saturated color be used, because with unsaturated colors the differentiation between the subject 7 and the color background 9 is reduced due to camera noise and camera spectral response limitations. In the light of this it is fortunate that the preferred color background color is green, because this color does not often occur in clothes (or hair).

As will be appreciated, a photographic system 1 according to the present invention is intended to be a very robust system requiring only a simple initial set up procedure and no operator adjustment during normal operations. Further, color fringing around a subject is removed or reduced to a level where it is not an objectionable artifact on the final image. Additionally, detail lost in the chroma-key process is largely replaced and the image processing requirements are minimized so that a fast software implementation may be achieved, thereby maximizing system productivity.

It will of course be understood that the present invention has been described above purely by way of example, and that modifications of detail can be made within the scope of the invention.

What is claimed is:

1. A photographic system comprising:

a digital still camera for producing a first output signal;

means for processing the first output signal with a pre-recorded second output signal to detect an object; and means for extracting and combining the detected object with a third image signal to produce a revised image signal, wherein the means for processing adjust the camera output signal to a gamma value of about unity prior to processing with the prerecorded second output signal.

2. A system as claimed in claim 1, comprising means for printing the revised image signal.

3. A system according to claim 2, wherein the processing means uses chroma-key processing to insert a background picture signal into a key color-characterized region of a foreground picture signal.

4. A photographic system comprising:

a digital still camera for producing an output signal, means for processing the output signal with a pre-recorded picture signal to produce a revised image signal; and means for printing the revised image, wherein the means for processing uses chroma-key processing to insert a background picture signal into a key color-characterized region of a foreground picture signal and the means for processing adjust the camera output signal to a gamma value of about unity prior to chroma-key processing.

5. A system as claimed in claim 4, wherein the processing means extracts and stores detail from the foreground picture signal prior to the chroma-key processing.

6. A photographic system comprising:

a digital still camera for producing an output signal, means for processing the output signal with a pre-recorded picture signal to produce a revised image signal;

means for printing the revised image;

wherein the processing means:

uses chroma-key processing to insert a background picture signal into a key color-characterized region of a foreground picture signal, and adjusts the camera output signal to a gamma value of about unity prior to the chroma-key processing, and extracts and stores detail from the foreground picture signal prior to the chroma-key processing; and wherein the detail from the foreground picture signal is re-combined with the revised image signal following the chroma-key processing and prior to the printing of the revised image.

7. A system as claimed in claim 6, wherein the detail from the foreground picture signal is limited to a peripheral region of a subject which is to appear in the revised image.

8. A system as claimed in claim 7, wherein the processing means compares the peripheral region signal with the signal from the key color-characterized region and, if a difference between the signals is below a threshold, the peripheral region signal is moved towards a neutral color.

9. A system as claimed in claim 8, wherein the processing means includes a reference image store for receiving chroma and/or luminance characteristics corresponding to the key color-characterized region of the foreground picture signal.

10. A system as claimed in claim 9, wherein the chroma and/or luminance characteristics are averaged over a seven pixel by seven pixel array.

11. A system as claimed in claim 10, wherein the digital still camera includes a charge coupled device array.

12. A system as claimed in claim 11, wherein a color filter array overlays the CCD array.

13. A system as claimed in claim 12, wherein the color filter array has a Bayer pattern of red, green and blue.

14. A system as claimed in claim 13, wherein a cathode ray tube display apparatus communicates with the digital still camera to display the output signal from the camera.

15. A system as claimed in claim 14, wherein the printing means comprises a thermal printer.

16. A system as claimed in claim 15, wherein the color of the key color-characterized region of the foreground picture signal is green.

17. A system as claimed in claim 16, comprising a light source for removing shadow from behind a subject during preparation of the digital still camera output signal.

* * * * *

UNITED STATES PATENT AND TRADEMARK OFFICE
CERTIFICATE OF CORRECTION

PATENT NO. : 6,441,865 B1  Page 1 of 1
DATED : August 27, 2002
INVENTOR(S) : Keith R. Hailey It is certified that error appears in the above-identified patent and that said Letters Patent is hereby corrected as shown below:

Title page,
Item [57], ABSTRACT,
-- A photographic system is provided, including a digital still camera, which is arranged to use chroma-key processing. The camera produces a first output signal and processes this with a pre-recorded second output signal to detect an object. The detected object is extracted and combined with a third image signal to produce a revised image signal. Prior to processing with the prerecorded second output signal, the camera output signal is adjusted to a gamma value of about unity. This ensures that the camera is suitably robust for operation, which is independent of ambient light conditions. --

Column 2,
Replace paragraph beginning with line 66 with:
-- The means for processing preferably compares the peripheral region signal with the signal from the key color-characterized region and, if a difference between the signals is below a threshold, the color of the peripheral region is moved towards neutral (i.e. gray). As a result, the key color of the background, which might otherwise appear as a colored halo, can be avoided. --

Signed and Sealed this

Twenty-eighth Day of January, 2003

JAMES E. ROGAN
*Director of the United States Patent and Trademark Office*